US008014290B2

(12) United States Patent
Ji

(10) Patent No.: US 8,014,290 B2
(45) Date of Patent: Sep. 6, 2011

(54) TRAFFIC FLOW MANAGEMENT THROUGH A MULTIPATH NETWORK

(75) Inventor: Minwen Ji, Sunnyvale, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 2643 days.

(21) Appl. No.: 10/687,798

(22) Filed: Oct. 17, 2003

(65) Prior Publication Data
US 2005/0086363 A1   Apr. 21, 2005

(51) Int. Cl.
*H04L 12/26* (2006.01)
(52) U.S. Cl. .................................. 370/237; 370/227
(58) Field of Classification Search .................. 370/216, 370/225, 227, 228, 230, 231, 235, 237, 238, 370/389, 229, 401, 468; 709/235
See application file for complete search history.

(56) References Cited

U.S. PATENT DOCUMENTS

| | | | | |
|---|---|---|---|---|
| 4,905,233 | A * | 2/1990 | Cain et al. ...................... | 370/237 |
| 5,959,968 | A * | 9/1999 | Chin et al. ...................... | 370/216 |
| 6,381,252 | B1 * | 4/2002 | Li et al. ........................... | 370/483 |
| 6,473,424 | B1 | 10/2002 | DeJager et al. | |
| 6,538,991 | B1 * | 3/2003 | Kodialam et al. ............. | 370/229 |
| 6,888,797 | B1 * | 5/2005 | Cao et al. ....................... | 370/235 |
| 7,082,101 | B2 * | 7/2006 | Kim et al. ....................... | 370/225 |
| 7,120,169 | B2 * | 10/2006 | Wolf et al. ..................... | 370/503 |
| 2002/0067693 | A1 * | 6/2002 | Kodialam et al. ............. | 370/216 |
| 2002/0122228 | A1 | 9/2002 | Rappaport et al. | |
| 2003/0002494 | A1 | 1/2003 | Kuukankorpi et al. | |
| 2003/0023877 | A1 | 1/2003 | Luther et al. | |
| 2003/0072261 | A1 * | 4/2003 | Shinagawa ..................... | 370/229 |
| 2003/0107992 | A1 * | 6/2003 | Garcia-Luna-Aceves et al. .............................. | 370/230 |
| 2003/0223413 | A1 * | 12/2003 | Guerrero ....................... | 370/389 |

OTHER PUBLICATIONS

E. Gustafsson et al., "A Literature Survey on Traffic Dispersion," IEEE Network, Mar./Apr. 1997, pp. 28-36.
D. Karger et al., "Consistent Hashing and Random Trees: Distributed Caching Protocols for Relieving Hot Spots on the World Wide Web," undated, 10 pages.
I. Stoica et al., "LIRA: An Approach for Service Differentiation in the Internet," undated, pp. 1-14.
X. Su et al., "Dynamic multi-path routing: asymptotic approximation and simulations," Copyright ACM Sigmetrics 2001, pp. 25-36.
Z. Wang et al., "Shortest Path First with Emergency Exits," Copyright ACM 1990, pp. 166-176.
W. T. Zaumen et al., "Loop-Free Multipath Routing Using Generalized Diffusing Computations," undated, 10 pp.
S. Knight et al., "Virtual Router Redundancy Protocol," Copyright The Internet Society 1998, pp. 1-27.
T. Li et al., "Cisco Hot Standby Router Protocol (HSRP)," Copyright the Internet Society 1998, pp. 1-17.

* cited by examiner

*Primary Examiner* — Ricky Ngo
*Assistant Examiner* — Gary Mui

(57) ABSTRACT

A method for managing traffic flow through a multipath network and systems and apparatuses configured to employ such a method are provided. The method includes forwarding a packet along a first link of the multipath network and tracking a load of the first link subsequent to forwarding the packet. In addition, the method includes preserving the first link for a subsequent packet having the same flow address as the forwarded packet upon determining a desired load change of the first link is less than a predetermined value.

28 Claims, 3 Drawing Sheets

Before Dial Adjustments

After Dial Adjustments

TRAFFIC FLOW MANAGEMENT THROUGH A MULTIPATH NETWORK

BACKGROUND

1. Field of the Subject Matter

The present disclosure generally relates to multipath computer networks and, more specifically, to methods, a system and apparatuses that manage traffic flow through a multiple path network.

2. Background Information

In computer network implementations, data may be transferred in packets between a source device and a destination device via one or more routers. In some cases, routers may include multiple ports such that packets may follow alternative paths to a destination device. Such a configuration is referred to herein as a "multipath network" and may generally refer to a network that has multiple media channels (including wired and wireless channels), multiple routes (such as those generated by a multipath routing protocol), or redundant links between a source and a destination. Traffic partitioning in multipath networks may, in some embodiments, be accomplished by dynamically distributing packets across routers. In one example of dynamic distribution of network traffic, the path loads within the network may govern the assignment of a data packet to a path. More specifically, a data packet may be forwarded along a path with the smallest load. Such a load balancing technique, however, may cause path oscillation (i.e., delivering packets of the same stream on different paths). Packets traveling from the same source to the same destination may generally be referred to herein as members of the same address flow or the same stream. In some cases, path oscillation causes packets of the same stream to be delivered to the destination address out of order. In such a case, the receipt of data at the destination device may be delayed relative to if the stream was delivered sequentially over the same path since the packets have to be reordered prior to being received at the destination address.

Other manners for dynamically partitioning network traffic include recording path assignments in individual routers or within the packet's header and adjusting the assignment as needed for load balancing. Such techniques may reduce path oscillation relative to the method described above in which path loads are used to govern the path assignment of a data packet. The method of storing path assignments or any additional information within a packet's header is sometimes referred to as packet tagging. Such a method may increase the processing time per packet within the routers, causing loads of the routers to increase relative to embodiments in which the path assignment is not recorded within the packet header. In addition, such a method involves multiple routers agreeing on the meaning of the recorded path assignments. Consequently, there is a setup cost associated with this method. The method of recording path assignments at each router, however, may entail the routers to store the status of each flow, which is sometimes referred to as "per-flow state-maintenance." A large amount of memory is needed for each router in such a method and, as a result, the number of flows per router is limited.

In some cases, the technique in which path assignments are determined at individual routers may be altered slightly by grouping flows into buckets according to their hashed addresses, where the number of buckets is smaller than the number of flows, but larger than the number of paths. The router maintains the path assignment for each bucket rather than for each flow, providing a coarser granularity than maintaining path assignments per flow. When path loads are unbalanced, at least one bucket of flows is moved across routes in order to rebalance the paths. A large number of buckets allows for fine-grained load balance but requires more memory and more computation, while a small number of buckets may not be effective in reducing path oscillation, especially if buckets are unevenly loaded. Consequently, such a technique includes some drawbacks with regard to the number of buckets selected to group the flows. In addition, when traffic patterns change, it might be necessary to reset the number of buckets accordingly. This is undesirable since resetting the numbers of buckets increases the burden on network management.

Regardless of the technique used, dynamic partitioning may, in some embodiments, reduce bandwidth on Transmission Control Protocol (TCP) connections. TCP is the protocol for the majority of traffic on the Internet and private networks and uses a congestion window to limit how fast the sender can inject packets into the network. In general, a network with larger capacity or less congestion will produce a larger window size, which allows higher sending bandwidth. If packets in the same TCP connection are transmitted over paths of different loss rates, the resulting bandwidth may reflect the highest loss rate rather than take advantage of the bandwidth available in lower-loss paths. Therefore, due to loss rate variation as well as out-of-order delivery, TCP traffic may not be able to consume the bandwidth otherwise made available by multipath networking when dynamic partitioning is employed.

As such, it would be advantageous to develop systems, apparatuses and methods for improving bandwidth utilization for Transmission Control Protocol (TCP) connections on multipath networks. In addition, it would be advantageous to develop systems, apparatuses and methods for distributing data packets on multipath networks that allow for fine-grained load balancing. Moreover, it would be beneficial for such system, apparatuses and methods to be configured to preserve a path for packets within the same flow as long as load balancing permits. In cases of unbalanced loads, however, it would be desirable for the system, apparatuses and methods to switch only a minimal amount of traffic between paths. In addition, it may be advantageous to develop system, apparatuses and methods of partitioning flows which do not require per-flow state-maintenance or packet tagging.

BRIEF SUMMARY

The problems outlined above may be in large part addressed by a method for managing traffic flow through a multipath network and systems and apparatuses configured to employ such a method. The method includes forwarding a packet along a first link of the multipath network and tracking a load of the first link subsequent to forwarding the packet. In addition, the method includes preserving the first link for a subsequent packet having the same flow address as the forwarded packet upon determining a desired load change of the first link is less than a predetermined value.

BRIEF DESCRIPTION OF THE DRAWINGS

For a detailed description of exemplary embodiments of the invention, reference will now be made to the accompanying drawings in which.

Figure 1:
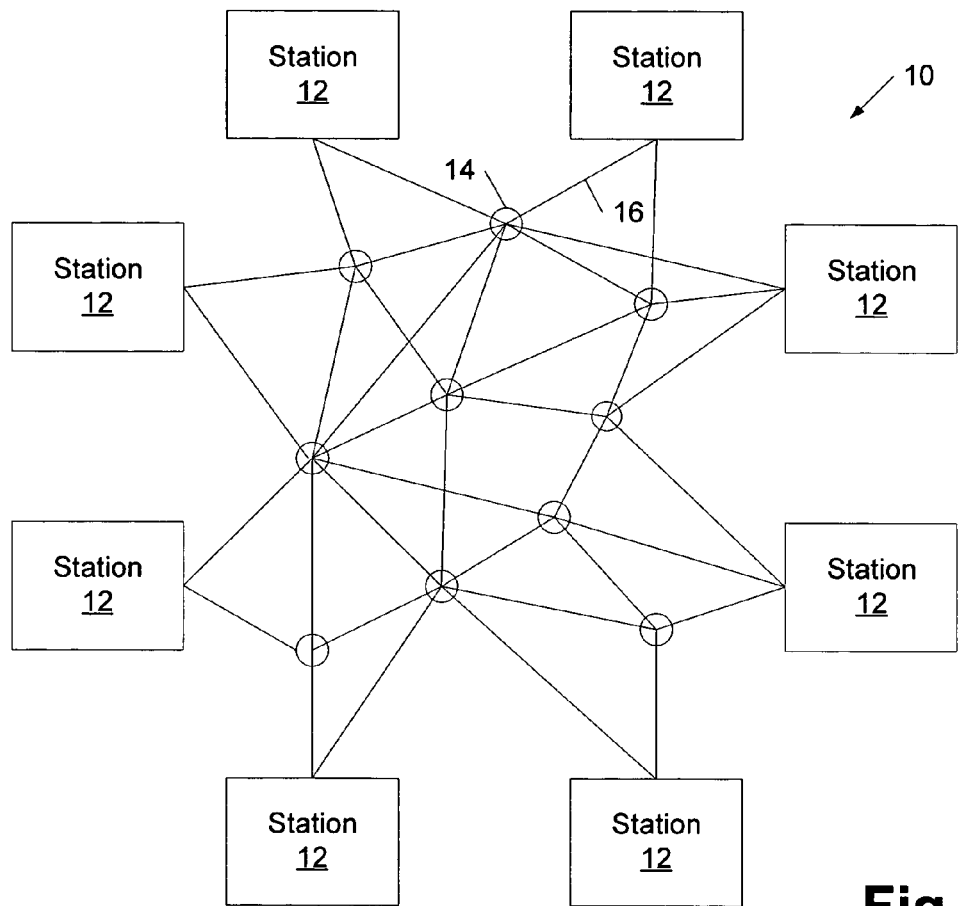
FIG. 1 depicts a schematic diagram of a multipath network.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ". Also, the term "couple" or "couples" is intended to mean either an indirect or direct electrical connection. Thus, if a first device couples to a second device, that connection may be through a direct electrical connection, or through an indirect electrical connection via other devices and connections.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims, unless otherwise specified. In addition, one skilled in the art will understand that the following description has broad application, and the discussion of any embodiment is meant only to be exemplary of that embodiment, and not intended to intimate that the scope of the disclosure, including the claims, is limited to that embodiment.

Turning now to the drawings, exemplary embodiments of system, apparatuses and methods for partitioning traffic through a multipath network are provided. In particular, a multipath network and a router which are configured to dynamically partition traffic are illustrated respectively in FIGS. 1 and 2, while FIG. 5 outlines a method for partitioning traffic within a multipath network. FIGS. 3a-4b illustrate schematic diagrams of a variable dial incorporated within multipath networks to partition packet traffic in the manner described in reference to FIGS. 1, 2 and 5. As noted above, the term "multipath network," as used herein, may generally refer to a network having multiple media channels (including wired and wireless channels), multiple routes (such as those generated by a multipath routing protocol), or redundant links between a source and a destination. In particular, a multipath network may generally refer to any network having two or more paths or routes through which a packet of data may be transferred from a source station to a destination station. The terms "path" and "route" may generally refer to the course of links a data packet travels through in a network and may be used interchangeably herein. The term "link," on the other hand, may generally refer to the transmission medium connecting two routers or connecting a router to a source or destination station. Thus, a path or a route typically comprises a plurality of links in a multipath network.

As shown in FIG. 1, multipath network 10 may include multiple stations 12 coupled to routers 14 via links 16. In general, multiple stations 12 may include devices that are configured to send and/or receive data, such as personal computers, workstations or servers. In addition, links 16 may include any transmission medium configured to transport data, such as a wire, cable, or wireless transmission link. Routers 14, on the other hand, may refer to any network device configured to forward data to a destination address of the data. As will be described in more detail below, routers 14 may be specifically configured to dynamically distribute data while minimizing path oscillation within multipath network 10, resulting in efficient utilization of the network and typically fast data transmission rates. In some cases, routers 14 may be classified into distinct categories, such as "edge routers" and "core routers." "Edge routers" may refer to routers which are arranged along the periphery of the mass of routers 14 and directly coupled to multiple stations 12. "Core routers," on the other hand, may refer to routers which are arranged within a central region of the mass of routers 14 and are indirectly coupled to multiple station 12 via an edge router and, in some cases, other core routers. The configuration of routers, as described herein, dynamically distributes traffic while minimizing path oscillation within the multipath network may be applied to any type of router, including edge and core routers.

As noted above, data may be transported through multipath network 10 in the form of packets. The term "packets" or "data packets" may generally refer to segmented units of data and are used interchangeably herein. The term "segmented", as used herein, may generally refer the action of splitting data into smaller units. In general, the data from a source location may be hashed into individual packets and the packets may be grouped back into the form of the data at or near the destination location. Such conversions may be governed by protocol specific to multipath network 10. For example, Transmission Control Protocol (TCP) may be used at least in some cases. In some cases, conversion of the data may be conducted by stations 12. Multipath network 10 additionally or alternatively may include other network devices to aid in the function and performance of the network, but are not illustrated in FIG. 1 to simplify the drawing. Such other network devices may include, but are not limited to, switches, gateways and probes.

As such, the system, apparatuses and methods described herein are not restricted to the configuration of multipath network 10 in FIG. 1. In particular, the system, apparatuses and methods described herein may be incorporated within and used in multipath networks having any type of network device known in the computer network industry. In addition, the system, apparatuses and methods described herein may be incorporated within and used in multipath networks having any number of stations, routers, links or any other network device and, therefore, are not restricted to the number of stations 12, routers 14 or links 16 depicted in FIG. 1. Moreover, the system, apparatuses and methods described herein may be used in public and private networks, including the Internet and private intranets.

Figure 2:
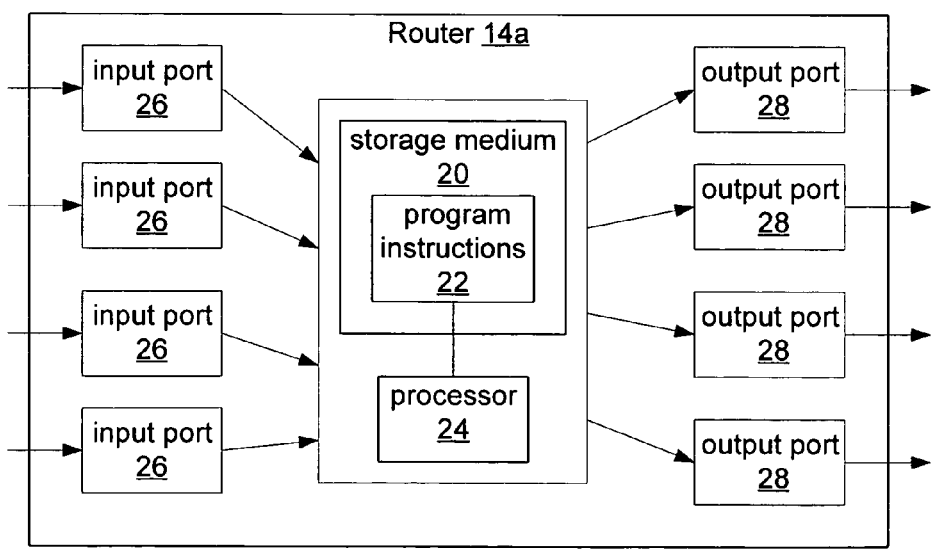
FIG. 2 depicts a schematic diagram of a multipath network router.

Turning to FIG. 2, an exemplary configuration of one of routers 14 is illustrated. In particular, router 14a is shown to include storage medium 20 with program instructions 22 which are executable by processor 24 for managing traffic flow through the router. More specifically, router 14a may be configured to receive input through input ports 26 and forward the input as output to output ports 28, which are configured to couple to links of a multipath network, such as links 16 described in reference to FIG. 1. In general, input may include a data packet sent from one of stations 12 serving as the source or another of routers 14 arranged along the path between the source location and router 14a. In turn, output may include the data packet with a link assignment to travel through one of output ports 28 to one of stations 12 serving as a destination or another of routers 14 arranged along a path between router 14a and the destination location.

As noted above, router 14a may be configured to dynamically distribute data while minimizing path oscillation within multipath network 10. More specifically, router 14a may include storage medium 20 having program instructions 22 which are executable through processor 24 for adjusting positions of one or more pointers used to partition traffic flow through multipath network 10. A more detailed description of the use of such pointers is provided below in reference to FIGS. 3a-4b. In general, however, the positions of the pointers are variable relative to a range of hash units corresponding to flow addresses between source and destination stations 12. As used herein, the "flow address" of a packet may generally refer to the source and destination devices between which the packet is transmitted. In this manner, router 14a may determine a port and a link to forward a packet along based upon a hash value of the packet's flow address. In some cases, such a selection of the port or link may be incorporated into storage medium 20 as program instructions. In some cases, the selected link may not be able to accept any packets. For example, a link can unexpectedly go down or the traffic hashed to a certain edge, as described below in reference to FIGS. 4a and 4b, may occur at such a high frequency that the links on both ends of the edge are congested. Consequently, in some cases, router 14a also may be configured to redirect packets from a selected link to another link that is available.

In any case, router 14a may be configured to track load conditions such as bandwidth, delay, loss rate or any other desired metric, of the links coupled thereto. Tracking load conditions generally may involve maintaining a variable per link, such as an exponential weighted moving average of the load (or any other variable metric, such as the present value of the load, for example), and updating the variable after a packet is forwarded from the router. Such bookkeeping requires little memory and, therefore, does not necessarily limit capacity of the router. Similar to the adaptation to select a port or link to forward a packet along, the adaptation of router 14a may be incorporated into storage medium 20 as program instructions or a different application within the router.

In some embodiments, router 14a may be configured to hash the flow address of the packet. In particular, storage medium 20 may include program instructions for performing a logical operation on a packet's flow address to obtain a representative hash number. In an alternative embodiment, multipath network 10 may be configured to hash a packet's flow address prior to being transmitted through routers 14. As a result, the configuration of routers 14 may be less complex and data transmission through multipath network 10 may be faster since a hashing function does not have to be performed at each router. A disadvantage of hashing the packet's flow address independent of routers 14, however, is the need for packet tagging due to storing the hash number in the packet's header.

The system, apparatuses and methods described herein may be used to hash a flow address of a packet into a hash number in the range of 0 to MaxHash. In one embodiment, the hash number is an integer. The parameter MaxHash may be used to define the granularity of balancing a load across available paths or links. In particular, the system, apparatuses and methods using one or more variable pointers to select an available path or link as described in reference to FIGS. 3a-4b may experience a transfer of at least 1/MaxHash of the flows between the available links or paths when one or more of the variable pointers are adjusted. The value of MaxHash, however, does not affect the amount of space required to record the status of a packet (i.e., state maintenance) in a router, since the routers described herein maintain a state per dial (i.e., pointer), not per hash unit as described in more detail below. The only cost for a large MaxHash value is the number of bits that the hash function needs to generate for each packet.

Figure 3A:
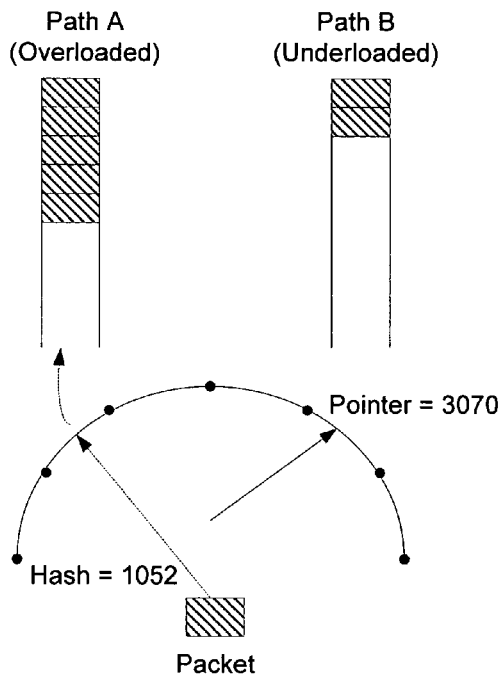
FIG. 3a depicts a schematic diagram of a variable dial used to partition traffic through a multipath network router having two available links to forward packets along.
Figure 3B:
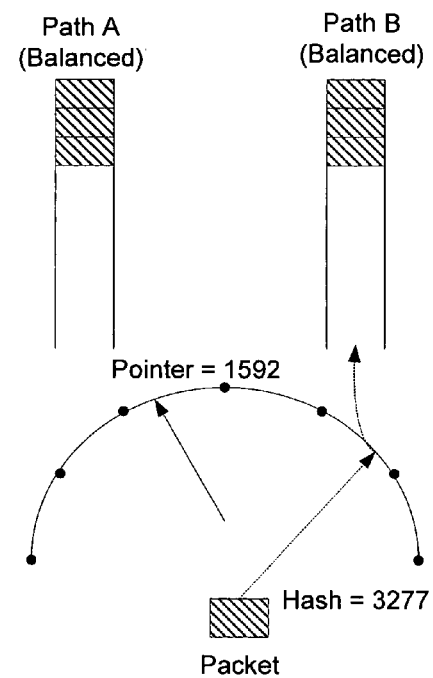
FIG. 3b depicts a schematic diagram of the variable dial in FIG. 3a having the pointer located in a different position.
Figure 4A:
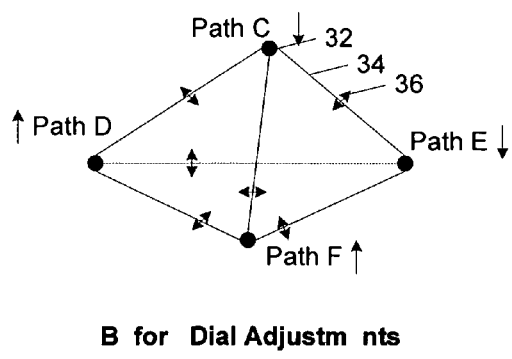
FIG. 4a depicts a schematic diagram of a variable dial used to partition traffic through a multipath network router having more than two available links to forward packets along.
Figure 4B:
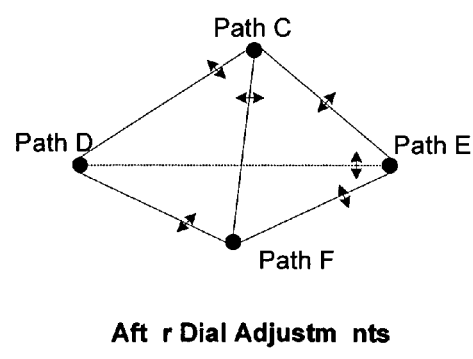
FIG. 4b depicts a schematic diagram of the variable dial in FIG. 4a in which some of the pointers are located in different positions.

As noted above, FIGS. 3a-4b illustrate schematic diagrams of a variable pointer incorporated within multipath networks to partition packet traffic. In particular, FIGS. 3a and 3b depict an embodiment in which two paths or links are available for partitioned traffic to follow. FIGS. 4a and 4b depict an embodiment in which four paths or links is available for partitioned traffic to follow. Although the embodiments discussed in reference to FIGS. 3a-4b are specifically described to have two and four paths or links to send packets along, respectively, the system, apparatuses and methods described herein are not restricted to any particular number of paths or links. In particular, the methods, system, and apparatuses described herein may be applied and incorporated into any multipath network.

In addition, the use of the pointers described in reference to FIGS. 3a-b may be used to select an entire path of a packet (i.e., the series of links and routers used to transmit a packet from a source station to a destination station) or may be used to select links at individual routers as a packet traverses through a multipath network. In other words, the system, apparatuses and methods described herein may be used to select links on a per-hop basis or end-to-end route extending from the source location and destination location. In yet other embodiments, the apparatus and methods described herein may be used to select portions of paths extending from the source location to the destination location. A "hop," as used herein, may generally refer to the portion of a path (i.e., link) extending between two routers. In some embodiments, it may be particularly advantageous to use the systems and method described herein as a per-hop basis such that packet tagging is not needed.

Turning to the embodiment in which only two paths or links are available for partitioned traffic to follow, the router uses a variable pointer having a hash value in the same range as defined in the hash function for packet flow addresses (i.e., in the range of 0 to MaxHash). Such a value of the variable pointer is used to determine which path or link to forward the packet along. More specifically, the hash value of the variable pointer is used to divide the range of hash values into two segments, causing packets with flow address hash numbers less than the hash value of the variable pointer to follow one link and packets with flow address hash numbers greater than the hash value of the variable pointer to follow the other link. For example, in an embodiment in which the flow address of a packet is 1052 and the hash number of the variable pointer is 3070 as shown in FIG. 3a, the packet will be directed to Path A. In another embodiment shown in FIG. 3b, the hash number of the flow address of a packet is 3277 and the hash number of the variable pointer is 1592, resulting in the packet directed to Path B. Consequently, the pointer configuration described in reference to FIGS. 3a and 3b is analogous to a dial labeled with the range of hash values and a pointer that divides the dial into two slices, one for each path or link. The notches shown on the dials depicted in FIGS. 3a and 3b are simply used to illustrate gradients within the dial and do not necessarily affect the position of the variable pointer or serve a function within the methods, system and apparatuses described herein.

The value of the variable pointer may be evaluated periodically or on demand, depending on the design specifications of the network. For example, the value or the variable pointer may be evaluated after a particular number of packets are forwarded within a router or may be evaluated upon detecting an extended delay at a destination station or an another router. In addition or alternatively, other periodic and demand parameters may be used depending on the design specifications of the network. In any case, the value of the variable pointer may be evaluated based upon the load balancing policy of the router and the measured load conditions on the two links. In particular, a desired load change for each link can be computed based upon measured load conditions on the two links and based upon the load balancing policy in the router. The point at which the value of the variable point is adjusted may be based upon the desired load change for each link. More specifically, the systems and method described herein may be configured to modify the value of the variable pointer to balance the loads on the links when a desired load change on a link exceeds a particular threshold. A "desired load change", as used herein, may generally refer to the load change needed to balance the loads on each path or link emerging from a router, based upon the load balancing policy in the router. Such a parameter may, in some embodiments, take into account the load of the next data packet to be sent from the router and, therefore, may not represent the current load status of the router.

If the desired load change does not exceed the threshold, the value of the pointer will not be changed and, thus, flows will be preserved for all packets. In other words, the router will maintain the path assignment for packets of the same stream when desired load changes are less than a predetermined value. Consequently, links may differ in load conditions, but may be preserved for packets of the same flow. In embodiments in which the desired load change does exceed the threshold, only the packets associated with the change in value of the variable pointer, as described in more detail below, will change paths. Alternatively stated, only the packets having a hash value that is affected by the change in value of the variable pointer will change paths. Consequently, some flows may be preserved even after the variable pointer is adjusted. As such, path oscillation may be minimized. The threshold of the loads may depend on the specifications of the load balancing policy of the router and, therefore, may differ from network to network and, in some cases, router to router.

The following is an exemplary pseudocode for adjusting the variable pointer, given current link loads and the desired load changes:

```
Procedure AdjustPointer (DIAL dial, METRIC load[2], METRIC
    dLoad[2])
    if dLoad[1] < 0 < dLoad[2] then
        # link overloaded and link 2 underloaded
        INT units = HashUnitsOnThisSide(dial.pointer, 1)
        METRIC weight = load[1]/units
        INT dUnits[2] = {dLoad[1]/weight, dLoad[2]/weight}
        INT delta = min(-dUnits[0], dUnits[1], units)
        dial.pointer -= delta
        dLoad[1] += delta*weight
        dLoad[2] -= delta*weight
    end if
    if dLoad[2] < 0 < dLoad[1] then
        # link 2 overloaded and link 1 underloaded
        # do the mirror operation
        ...
    end if
    # otherwise, pointer is not adjusted
```

The technique described above determines the number of hash units by which to move the variable pointer such that divisions of the hash numbers corresponding to the two paths or links are changed. More specifically, the technique determines the number of hash units to move from an overloaded link to an underloaded link such that fewer packets are forwarded along the overloaded link. The terms "overloaded" and "underloaded" may refer to load levels which are respectively greater than and less than predetermined load limits used to signify an inefficient use of paths across a multipath network. Such predetermined load limits may be arbitrary and may be set for the specific network in which they are applied. In addition, the overload and underload load limits may be different values or may be the same value. Turning to FIGS. 3a and 3b, an example of moving a number of hash units from an overloaded link to an underloaded link is illustrated. In particular, the value of the variable pointer depicted in FIGS. 3a and 3b is changed from 3070 to 1592, narrowing the range of hash numbers of packets to be forwarded along Path A and widening the range of hash numbers of packets to be forwarded along Path B. Consequently, Paths A and B are balanced in FIG. 3b as a result of the adjustment in the variable pointer. As noted in the pseudocode above, the number of hash units by which to adjust the variable pointer is based on the average amount of load in each unit ("weight"), the desired load change on each link or path ("dLoad"), and the maximum possible movement of the pointer ("units"). In addition to adjusting the value of the variable pointer, the technique also updates the desired load changes of the newly segmented paths for further use.

In an embodiment in which more than two paths or links are available for partitioned traffic, segmenting a dial into a number of segments equal to the number of links as described above in reference to FIGS. 3a and 3b, may not adequately minimize the amount of traffic switching between links when pointers are adjusted. In particular, traffic, in such an embodiment, can only be moved from an overloaded link to its neighboring links. If the neighboring links become overloaded as a result, other pointers will need to be adjusted, resulting in a cascading effect. Therefore, more traffic than necessary will have to switch links. Consequently, in an embodiment in which more than two paths or links are available for partitioned traffic, the configuration of the pointers are preferably configured to change link assignments monotonically, i.e., each path or link either gains traffic or loses traffic, but not both.

In order to make monotonic changes, traffic needs to be moved between any two links. Consequently, a traffic-partitioning scheme for multipath networks having more than two available paths or links is provided in which each link is represented as a vertex in space, an edge between every pair of vertices is drawn and a dial is maintained on each edge. As shown in FIGS. 4a and 4b, a traffic partitioning scheme for a multipath network having four available paths or links may be depicted with available Paths C, D, E and F at the vertexes 32. In addition, edges 34 may be drawn between each pair of paths or links and dials 36 may be positioned along edges 34. In general, high-order bits of a packet's flow address hash number may be used to assign the packet to an appropriate edge corresponding to such a range of high-order bits. In addition, the low-order bits of a packet's flow address hash number may be used to position respective to the dial on the corresponding edge. Consequently, the dial is used to determine which vertex (or link) to forward the packet.

As with the pointer scheme described in reference to FIGS. 3a and 3b, the value of dials 36 may be evaluated periodically or on demand, depending on the design specifications of the network. In addition, the value of dials 36 may be adjusted based upon the load balancing policy of the router and the measured load conditions on the four links exceeding a certain threshold. If the desired load changes do not exceed the threshold, the value of dials 36 will not change and, thus, flows will be preserved for all packets. In embodiments in which desired load changes do exceed the threshold, however, link assignments are preferably changed monotonically as noted above. As such, dial adjustments are preferably performed one at a time and between an overloaded link and an underloaded link. No dial adjustments are typically made between overloaded links or between underloaded links. The desired load changes on each of the links are updated accordingly after each adjustment.

In some cases, adjusting the dials in a particular order may reduce path oscillation. As such, a strategy is provided which moves traffic from the overloaded links in ascending order of desired load changes (which are negative) and move traffic to underloaded neighbor links in descending order of desired load changes (which are positive). In some cases, there might be a large difference in the capacity of different links to the same destination, possibly causing a pointer to be adjusted more frequently. Such an issue, however, may be lessened by weighting assignments of flows to edges according to the following equation. Letting $c_i$ be the capacity of link i ($1 \leq i \leq n$), and $C = \Sigma^n_{i=1} c_i$, the portion of flows that are assigned to the edge between link i and j may then be $(c_i + c_j)/((n-1) \times C)$. Such an assignment can be determined once and stored in a table with n entries for repeated lookups.

Given the current load and desired load change on each link, the following technique may be used to determine the monotonic pointer adjustments within a traffic scheme in which more than two paths or links are available for traffic to follow. Such a technique references the technique used in reference to FIGS. 3a and 3b and, therefore, may include similar variables. However, in the version of AdjustPointer( ) for multiple links, the variable "units" is calculated as the sum of units on the near side of the pointers on all dials attached to the overloaded link.

```
Procedure AdjustPointers(DIAL dials[n,n], METRIC load[n],
METRIC dLoad [n])
    for each overloaded link O in ascending order of dLoad[O] do
        LINK_SET neighbors = OtherEndsOfDials (dials, O)
        for each underloaded link U in neighbors in descending
        order of dLoad[U} do
            AdjustPointer(dials[0,U],  {load[O],  load[U]},
            {dLoad[O], dLoad[U]})
        end for
    end for
```

Figure 5:
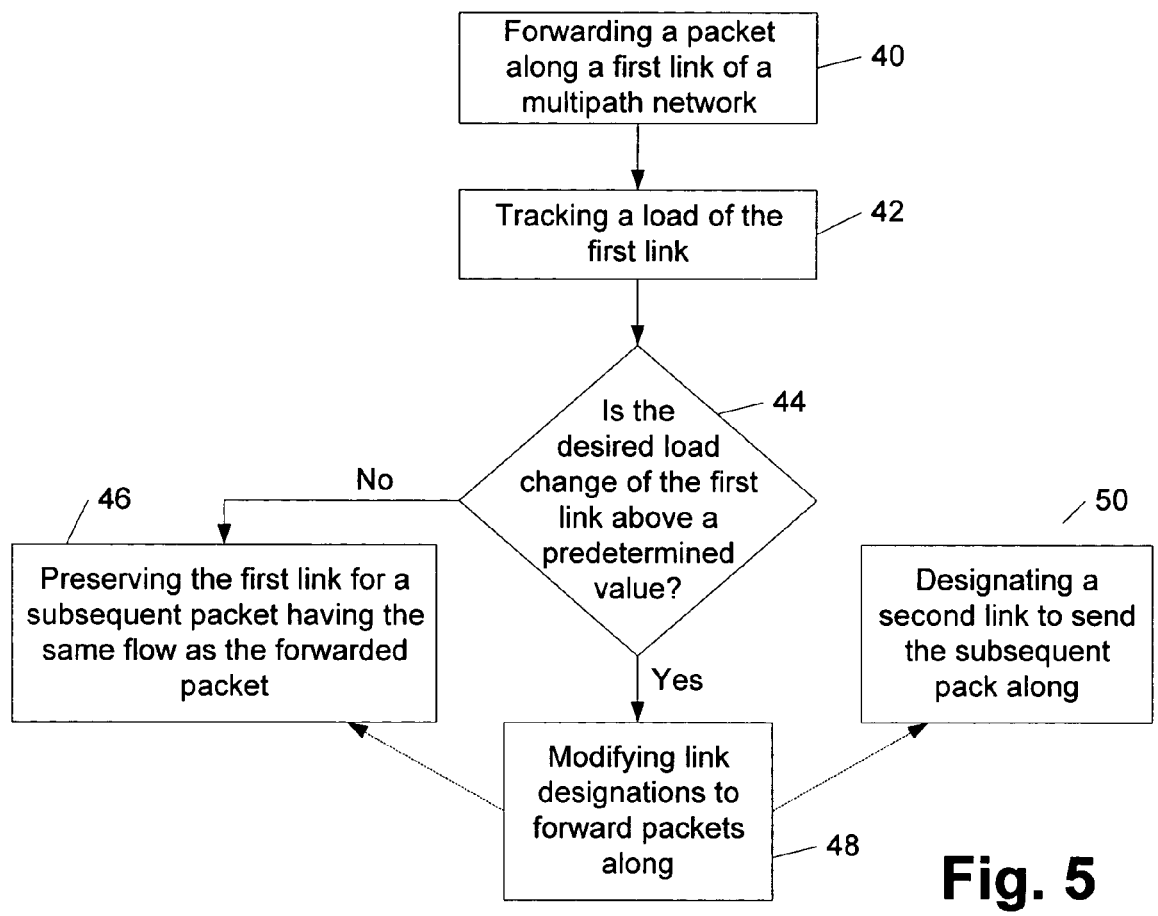
FIG. 5 depicts a flowchart of an exemplary method for partitioning traffic through a multipath network.

A method for partitioning traffic through a multipath network is outlined in FIG. 5. The method may include step 40 in which a packet is forwarded along a first link of a multipath network. Such a process step may include selecting a link or path of the multipath network based upon a hash number representative of a flow address of the packet and relative hash numbers of one or more pointers as described above in reference to FIGS. 1-4b. In yet other embodiments, the flow address may be hashed at another step of the process. In either case, the method may include step 24 in which a load of the first link is tracked. Such a step may also include tracking all other links coupled to the router.

As noted in decision junction 44, a determination is made as to whether the desired load change of the first link is above a predetermined value. As noted above in reference to FIGS. 3a-3b, when the load of the links is below a particular threshold, the pointer value will not be adjusted and all traffic flow will be preserved. As such, upon determining the desired load change of the first link at decision junction 44 is not above a predetermined value, the method may continue to step 46 in which the first link is preserved for a subsequent packet having the same path as the packet forwarded in step 40. Alternatively, in an embodiment in which the desired load change of the first link is above the predetermined value, the method may continue to step 48 in which the link designation to forward packets along are modified. As noted above, however, such a modification to the link designations may only change packet flows corresponding to the hash units associated with the change to the value of the pointer. Consequently, the first link may be preserved for a subsequent packet having the same path as the packet forwarded in step 40, in some cases. In other cases, however, a second link may be designated for such a subsequent packet as noted in step 50. Steps 46 and 50 are shown connected to step 48 in FIG. 5 by dotted lines to illustrate that either step may result from the modification of the link designations.

Although the aforementioned traffic partitioning schemes offer a manner in which to dynamically partition traffic through a multipath network with minimal path oscillation, such schemes may be susceptible to regularly sending flows with certain addresses to a low-quality link. Such a situation may be undesirable when flows are sent to links with high loss rates. A simple fix to the problem may include periodically changing the parameters of the hash function so that flows can be hashed to different links at different times. However, such a technique may increase path oscillation for all flows. In general, the bandwidth of a TCP connection will likely be reduced when it switches from a lower-loss path to a higher-loss path, but not necessarily the other way around. In addition, a short-lived connection may be terminated before it has a chance to consume the available network bandwidth. Therefore, it is hypothesized that bandwidth can be overall better utilized if TCP connections move to lower-loss paths as they age.

A fairness mechanism referred to as path rotation is provided. In particular, a network device, such as a router, is provided with a means to switch flows between links of differing loss rates. Such a means may be incorporated within a storage medium with programs instructions executable by a processor, similar to storage medium 20 described in reference to FIG. 2. In yet other embodiments, the means may be incorporated into the network device in another manner. In any case the means may be used to number the n links for a destination in descending order of their long-term average loss rates. Since the long term (e.g., daily) average loss rate of a link is reasonably stable, external information, such as Service Level Agreement (SLA) with the network provider, or simply network managers' knowledge, may be used for sorting the links. In other embodiments, however, the loss rates of each link may be measured.

The same traffic-partitioning scheme discussed above in reference to FIGS. 4a and 4b is used except that each vertex in the dial structure no longer corresponds to a fixed link. Instead, the link L (0≤L<n) for a vertex V (0≤V<n) is determined by L=(V+k) % n, where k is a non-negative integer that increments by 1 at a certain interval "I". In some cases, interval I may be assigned a time between approximately 60 and approximately 90 seconds, since statistically 81% and 84% of TCP connections last less than approximately 60 and approximately 90 seconds, respectively. Interval I, however, may include other ranges of times, particularly for TCP connections with different life spans. In particular, interval I may generally be assigned a time that is slightly long than the life spans of the majority of flows that traverse the network. In any case, whenever k increases, roughly 1/n of the flows switch from the lowest-loss link to the highest-loss link, while roughly (n−1)/n of the flows switch from a higher-loss link to a lower-loss link. In this manner, most TCP connections will remain within the same path during its lifetime and flows have an equal opportunity to use any path.

The positions of the pointers in the traffic partitioning schemes described herein are preferably adjusted in embodiments in which links are added or removed at a router junction. In addition the position of pointers may need to be adjusted as relative loss rates of links changes. As noted above, such modifications may result in path changes for flows. However, changes in long-term link characteristics and permanent addition and removal of links are rare, so such situations may not affect the ordinary use of the partitioning schemes.

The above discussion is meant to be illustrative of the principles and various embodiments of the present invention. Numerous variations and modifications will become apparent to those skilled in the art once the above disclosure is fully appreciated. For example, the system, apparatuses and methods described herein may be used in any multipath network. In particular, the systems and method may be used in a multipath network of any size or capacity. In addition, the system configurations and methods described herein may be used independent of traffic distribution in multipath networks. For example, the system configurations and methods may be used to distribute data among multiple storage devices or distribute workloads among multiple servers. It is intended that the following claims be interpreted to embrace all such variations and modifications.

What is claimed is:

1. A method for managing traffic flow through a multipath network, comprising:
    forwarding a packet along a first link of the multipath network;
    tracking a load of the first link subsequent to forwarding the packet;
    preserving the first link for a subsequent packet having the same flow address as the forwarded packet upon determining a desired load change of the first link is less than a predetermined value; and
    adjusting positions of one or more pointers used to partition traffic flow through the multipath network, wherein the positions of the one or more pointers are variable relative to a range of hash units that correspond to the flow addresses within the multipath network.

2. The method of claim 1, further comprising modifying link designations to forward packets along upon determining the desired load change of the first link is greater than the predetermined value.

3. The method of claim 2, wherein modifying link designations comprises designating a second link to send the subsequent packet along.

4. The method of claim 2, wherein modifying link designations comprises preserving the first link to send the subsequent packet along.

5. The method of claim 1, wherein tracking the load comprises tracking one or more variables associated with the load of the first link.

6. The method of claim 5, wherein the one or more variables comprise bandwidth of the first link.

7. The method of claim 5, wherein the one or more variables comprise a delay of the first link.

8. The method of claim 5, wherein the one or more variables comprise a loss rate of the first link.

9. A non transitory computer-readable storage medium comprising program instructions that are executable by a processor and that cause the processor to:
    adjust positions of one or more pointers used to partition traffic flow through a multipath network, wherein the positions of the one or more pointers are variable relative to a range of hash units that correspond to flow addresses within the multipath network.

10. The computer-readable storage medium of claim 9, wherein the program instructions for adjusting the positions of the one or more pointers comprise program instructions for modifying a position of one pointer at a time.

11. The computer-readable storage medium of claim 10, wherein the program instructions for adjusting the positions of the one or more pointers comprise program instructions for:
    modifying a hash number of a first pointer positioned between a highest loaded link and a least loaded link; and
    subsequently modifying a hash number of a second pointer positioned between a second highest loaded link and a second least loaded link.

12. The computer-readable storage medium of claim 9, wherein the program instructions for adjusting the positions of the one or more pointers are directed for use by an individual router of the multipath network.

13. The computer-readable storage medium of claim 12, wherein the program instructions for adjusting the positions of the one or more pointers comprise program instructions for:
    calculating an average amount of load per hash unit for individual links coupled to the router; and
    calculating a desired load change on the individual links.

14. The computer-readable storage medium of claim 9, further comprising program instructions for selecting a link of the multipath network to send a packet along based upon a hash number representative of a flow address of the packet and relative hash numbers of one or more the pointers.

15. The computer-readable storage medium of claim 14, further comprising program instructions for hashing the flow address of the packet.

16. A router, comprising:
    multiple ports for coupling to links of a network; and
    a storage medium comprising program instructions executable using a processor for
        selectively directing a data packet to one of the multiple ports; and altering one or more of the conditions by which the data packet is selectively directed.

17. The router of claim 16, wherein the one or more conditions comprise hash number values of one or more variable pointers configured to partition a range of hash numbers associated with possible flow addresses of the data packet.

18. The router of claim 16, wherein the one or more conditions comprise specific hash number ranges associated with possible flow addresses of the data packet.

19. The router of claim 16, wherein the program instructions are executable using the processor for altering the one or more conditions to reflect a load balancing policy of the router.

20. The router of claim 16, wherein the program instructions are executable using the processor for accounting for the capacity of the links coupled to the multiple ports when the one or more conditions are altered.

21. The router of claim 16, wherein the program instructions are executable using the processor for altering the one or more conditions to monotonically balance loads between two of the multiple ports.

22. The router of claim 16, wherein the program instructions are executable using the processor for redirecting the data packet to another of the multiple ports upon detecting the one multiple port cannot accept the data packet.

23. A network, comprising:
    multiple stations configured to send and receive data packets; and
    a plurality of routers interposed between the multiple stations and interconnected by a mesh of links, wherein each router is configured to
        selectively direct a first packet along a link coupled thereto in accordance with one or more variable pointers included within the router; and
        record the status of the one or more variable pointers to direct a second packet having the same source and flow addresses as the first packet along the same link.

24. The network of claim 23, wherein each router is further configured to alter the positions of the one or more variable pointers.

25. The network of claim 23, wherein each router is configured to track the load conditions of the links coupled thereto.

26. The network of claim 23, wherein at least one router of the plurality of routers comprises a means for changing transmission control protocol connections among links of differing loss rates associated with the router.

27. A network device, comprising:
    a router; and
    a means for periodically changing transmission control connections among links of different loss rates which are coupled to the router, comprising:
        a means for numbering the links in descending order of their long-term average loss rates; and
        a means for modifying designations of hash numbers associated with the links such that 1/n of the flows switch from the lowest-loss link to the
        highest-loss link and the remaining flows switch from a higher-loss link to a lower-loss link;
    wherein n is greater than zero.

28. The network of claim 27, wherein the means for modifying the designations of hash numbers is configured to modify the hash number designations at an interval that is slightly longer than the life spans of the majority of flows that traverse the network.

* * * * *